Dec. 28, 1948.  J. A. WOODHEAD  2,457,295
DUCK DECOY

Filed Jan. 14, 1944  2 Sheets-Sheet 1

INVENTOR.
JOHN A. WOODHEAD
BY Joshua R. H. Potts

Dec. 28, 1948.   J. A. WOODHEAD   2,457,295
DUCK DECOY

Filed Jan. 14, 1944   2 Sheets-Sheet 2

INVENTOR.
JOHN A WOODHEAD
BY Joshua R. H. Potts

Patented Dec. 28, 1948

2,457,295

UNITED STATES PATENT OFFICE 2,457,295

DUCK DECOY

John A. Woodhead, Swarthmore, Pa.

Application January 14, 1944, Serial No. 518,229

6 Claims. (Cl. 43—3)

This invention relates to duck decoys and is concerned primarily with the provision of such a decoy which is made to closely simulate the movement of a real duck.

In the sport of duck hunting, the use of duck decoys has long been recognized as necessary if the hunter is to obtain any shots at the game within range. In view of this recognition, many types of decoys have been proposed, but, prior to this invention, all of the known decoys have failed to simulate the actions and movements of a duck in many respects.

Accordingly, this invention has in view, as its foremost objective, the provision of a duck decoy which closely imitates the actual movement of a duck.

More in detail, the invention has as an object the provision of a duck decoy of the character aforesaid which includes foot members that are mounted on the decoy body in such a manner than when the duck is tilted, as in simulation of feeding, a lifelike movement will be imparted to the foot members. In carrying out this idea, the foot members are mounted on springs which impart the necessary fluttering action thereto.

Yet another object is the provision of a duck decoy of the character aforesaid which includes a head that is hingedly mounted and adapted to be moved in the manner of a live duck.

A further highly important object is the provision of a duck decoy of the type above noted which includes an anchor with which is associated a sheave. A line is suitably attached to the duck decoy itself and, due to its passage over the sheave, is readily adapted to be jerked or pulled to impart lifelike movements to the decoy.

Various other more detailed objects and advantages of the invention, such as arise in connection with carrying out the above noted thoughts in a practical embodiment, will in part become apparent and in part be hereinafter stated as the description of the invention proceeds.

The invention, therefore, comprises a decoy duck consisting of a body provided with a pair of spring-mounted foot members. A head is also hingedly mounted on the body, and a line is anchored to the body and passes over a sheave which is included as part of an anchor.

For a full and more complete understanding of the invention, reference may be had to the following description and accompanying drawing, wherein.

Figure 1:
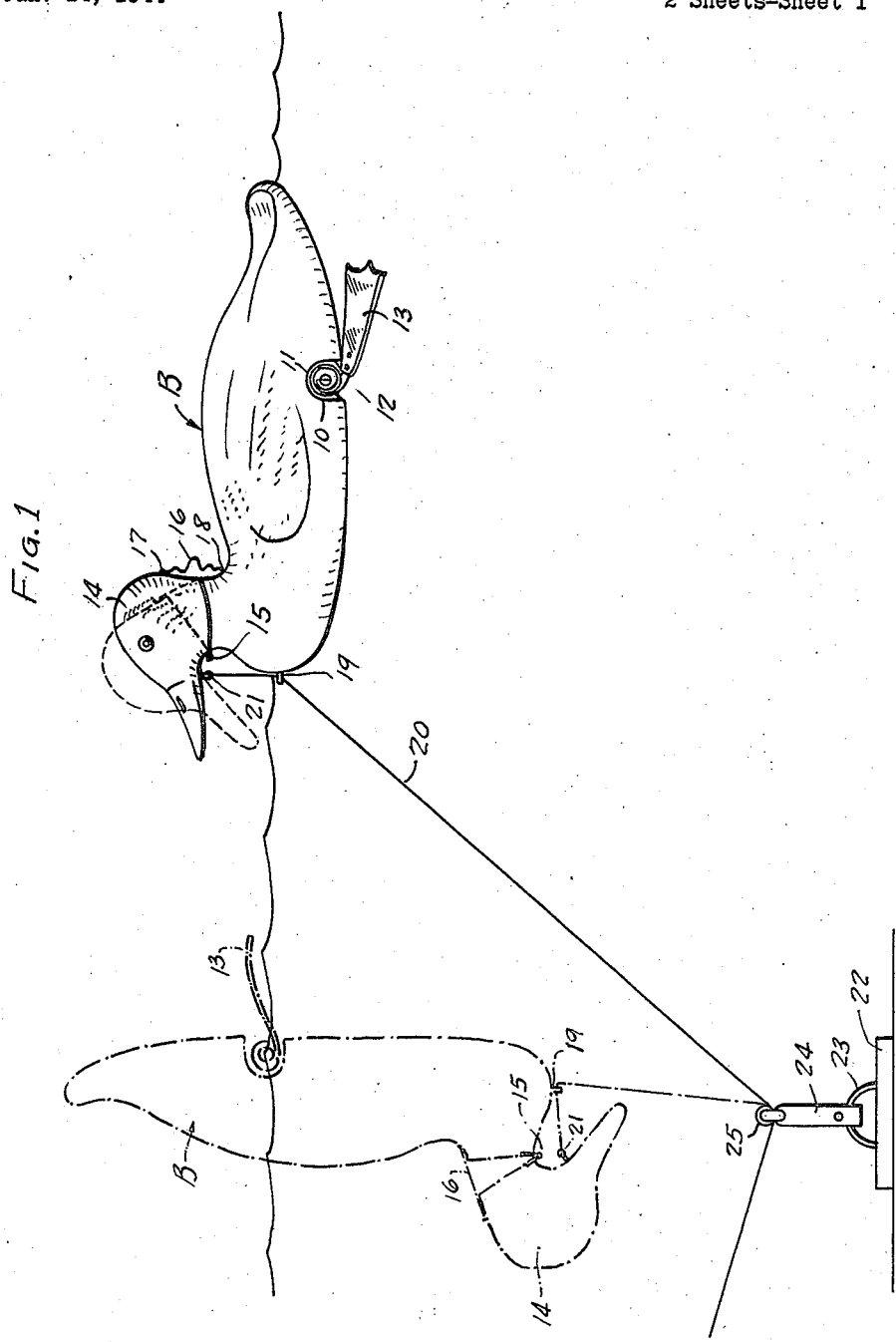
Figure 1 is a side view illustrating a duck decoy made in accordance with the precepts of this invention. In this view, dotted lines indicate certain positions of the head and the decoy.
Figure 2:
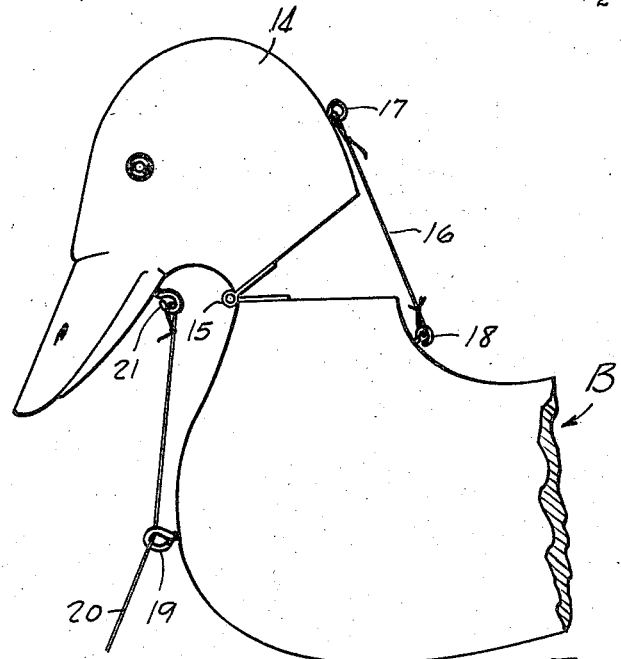
Fig. 2 is an enlarged detailed showing in side elevation of the head of the decoy and the portion of the body immediately adjacent thereto.
Figure 3:
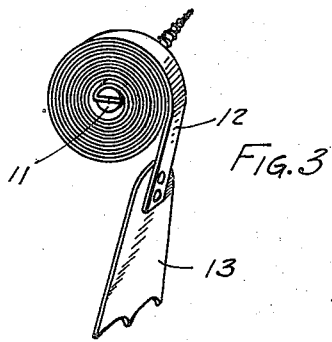
Fig. 3 is an enlarged detailed view in perspective of one of the spring mountings for a foot.
Figure 4:
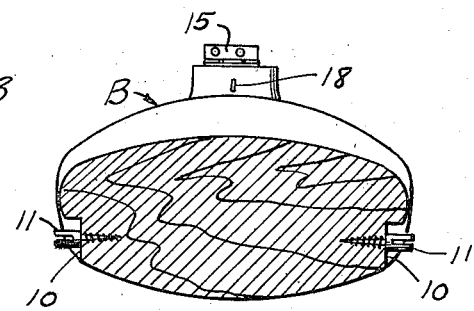
Fig. 4 is a transverse section through the body with the head removed.
Figure 5:
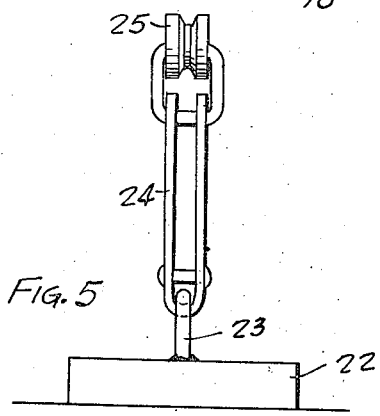
Fig. 5 is an enlarged detailed view in elevation of the anchoring device.

Referring now to the drawings, wherein like reference characters denote corresponding parts, the body of a duck decoy is referred to in its entirety by the reference character B. The body B will be made from an appropriate material having required properties of buoyancy. On opposite sides, the body B is formed with a pair of recesses 10 into which are fitted pins 11. Anchored to each of the pins 11 is a spiral spring 12, and the free end of each spring 12 has secured thereto a foot member 13.

A head member 14 is hinged at 15 to the body B. A snub line 16 is anchored to the head at 17 and to the body B at 18. This snub line 16 serves to limit movement of the head 14.

It will be noted that in the full line position, shown in the drawing, gravity action will cause the head 14 to remain in its normal position. An eyelet 19 is secured to the body B, preferably at the breast as illustrated, and a line 20 passes through this eyelet 19 and is anchored at 21 to the underside of the head 14.

An anchor is shown at 22 and includes a ring 23 which slidably carries a link 24 which in turn carries a sheave 25. The line 20 passes under this sheave 25.

While the mode of using the above described duck decoy is believed to be obvious, it may be briefly outlined by noting that the sportsman after first passing the line 20 about the sheave 25 drops the anchor 22 at a suitable location. The duck decoy will, of course, float on the surface of the water. The hunter then returns to the blind, at the same time, paying out the line 20, so that he may operate this line from the blind. A slight jerk or pull on the line will cause the head 14 to bob, as depicted by the dotted lines. Gravity action, of course, causes the head to return to its normal position. When the sportsman is desirous of having the decoy imitate a feeding duck, a longer pull is given the line 20, whereupon the duck dives, as shown in the dotted line position, and the foot member 13 becomes visible on the water surface. When the line is released, the buoyancy of the duck body causes it to return to its normal position on the water surface.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claims.

What is claimed is:

1. A duck decoy comprising a body, and a pair of foot members movably mounted on said body, by a pair of spirally wound flat metal springs, each spring having one end secured to said body and the other end attached to the respective foot member.

2. A duck decoy comprising a body, a pair of foot members, and a pair of springs mounting said foot members on said body, each of said springs having one end anchored to said body and the other end secured to the respective foot member whereby said feet will exhibit a fluttering action when positioned on the surface of water.

3. A duck decoy comprising a body formed with a pair of recesses disposed respectively at opposite sides of said body, an anchoring pin in each recess, a spiral spring anchored to each pin, and a foot member secured to each spring.

4. In a duck decoy, a body, an eyelet carried by said body substantially at the breast thereof, a head member hinged to said body, a line passing through said eyelet and secured to said head member, and an anchorage including a sheave about which said line passes.

5. In a duck decoy, a buoyant body having a head and a tail with the center of gravity of said body disposed therebetween, foot members secured to said body by spiral springs and located between said center of gravity and said tail in such a position that when the body assumes a vertical position in water said feet appear on the surface of the water, said head being hinged to said body, a snub line for limiting movement of said head, an eyelet carried by said body substantially at the breast thereof, a line passing through said eyelet and secured to said head, and an anchor including a sheave about which said last mentioned line passes.

6. A decoy comprising a body, a head pivotally mounted on the body, an eyelet on the body at a point between the pivot and the bottom of the body, means limiting hinging movement of the head, and a line secured to the head and extending through the eyelet for moving the head from a remote point.

JOHN A. WOODHEAD.

REFERENCES CITED

The following references are of record in the file of this patent:

UNITED STATES PATENTS

| Number | Name | Date |
|---|---|---|
| 109,992 | Hart | Dec. 6, 1870 |
| 217,483 | Redmond | July 15, 1879 |
| 323,620 | Amsbry | Aug. 4, 1885 |
| 717,790 | Yorke | Jan. 6, 1903 |
| 1,392,065 | Klock | Sept. 27, 1921 |
| 1,571,203 | Pitts | Feb. 2, 1926 |
| 1,616,006 | Simbaldi | Feb. 1, 1927 |